United States Patent
Chin et al.

(10) Patent No.: US 10,666,150 B1
(45) Date of Patent: May 26, 2020

(54) FLYBACK CONVERTER WITH OUTPUT CURRENT CALIBRATION

(71) Applicant: DIALOG SEMICONDUCTOR INC., Campbell, CA (US)

(72) Inventors: Kai-Wen Chin, Campbell, CA (US); Jianming Yao, Campbell, CA (US); David Nguyen, Campbell, CA (US); Tao Li, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days.

(21) Appl. No.: 16/215,302

(22) Filed: Dec. 10, 2018

(51) Int. Cl.
*H02M 3/335* (2006.01)
*H01M 10/44* (2006.01)
*H02M 1/00* (2006.01)

(52) U.S. Cl.
CPC ..... *H02M 3/33507* (2013.01); *H02M 3/3353* (2013.01); *H01M 10/44* (2013.01); *H02M 2001/0009* (2013.01); *H02M 2001/0012* (2013.01); *H02M 2001/0025* (2013.01)

(58) Field of Classification Search
CPC ........... H02M 3/33507; H02M 3/3353; H02M 2001/0012; H02M 2001/0009; H02M 2001/0025; H01M 10/44
See application file for complete search history.

(56) References Cited

U.S. PATENT DOCUMENTS

2017/0212632 A1*  7/2017  Shi ..................... G06F 3/0416

* cited by examiner

*Primary Examiner* — Adolf D Berhane
*Assistant Examiner* — Afework S Demisse
(74) *Attorney, Agent, or Firm* — Haynes and Boone, LLP

(57) ABSTRACT

An output current calibration is disclosed to increase the accuracy and precision of the constant-current mode for a flyback converter.

19 Claims, 6 Drawing Sheets

FLYBACK CONVERTER WITH OUTPUT CURRENT CALIBRATION

TECHNICAL FIELD

This application relates to flyback converters, and more particularly to a flyback converter with output current calibration.

BACKGROUND

The charging of a battery for a battery-powered device occurs through various constant-voltage or constant-current modes depending upon the state of the battery charge. As implied by the name, the charging voltage stays constant at some fixed level during a constant-voltage mode whereas the charging current may vary. Conversely, the charging current stays constant during a constant-current mode whereas the charging voltage may vary. The proper sequencing and control of the constant-voltage and constant-current modes is vital with regard to battery longevity. For example, a smartphone's battery is often integrated and non-removable. If the battery for such a device is damaged, the entire smartphone must be replaced. It is thus conventional for a mobile device to include a battery management circuit that controls the charging voltage and charging current for the battery.

Since the battery management circuit within the mobile device is controlling the charging voltage and charging current applied to the battery, the tolerances for the switching power converter supplying power to the mobile device are relaxed. An example charging system is shown in FIG. 1. A switching power converter such as a flyback converter 100 converts an input voltage into a regulated output voltage V_out during a constant-voltage mode of operation. A battery-powered device such as a smartphone 105 includes a battery management circuit 110 that controls the constant-voltage or constant-current charging applied to a battery for powering a system 115 using the output power from flyback converter 100. For example, in a constant-voltage mode, battery management circuit 110 regulates the constant output voltage from flyback converter 100 into a constant charging voltage for the battery. Similarly, in a constant-current mode, battery management circuit 110 regulates the constant output current from flyback converter 100 into a constant charging current for the battery. This regulation by battery management circuit 110 provides some tolerance for the regulation in flyback converter 100.

For example, the output voltage and output current tolerance for flyback converter 100 may be +/−5% as shown in FIG. 2 for the constant-voltage and constant-current modes of operation. For a desired constant-voltage mode of 5 V, the 5% tolerance means that output voltage can actually range from 4.75 V to 5.25V. To maintain regulation during constant-voltage operation, a primary-side controller (not illustrated) in flyback converter 100 needs some means of sensing the output voltage. In a primary-only-feedback configuration, the output voltage may be sensed through an auxiliary winding (or through the primary winding). As also shown in FIG. 2, an analogous tolerance range occurs for the output current during the constant-current mode of operation. Just like the output voltage, a primary-side controller cannot sense the output current directly but must instead do so indirectly. To indirectly sense the output current, a primary-side controller may sense the peak current in a switching cycle through the power switch using a sense resistor. The output current can then be estimated since the output current is proportional to the peak current. In particular, this proportionality depends upon a number of factors including the transformer turns ratio, the switching period, the sense resistor resistance, and the transformer reset time.

Such indirect sensing of the output current is adequate if the output current tolerance is fairly large such as shown in FIG. 2. But portable devices have been developed in which battery management circuit 100 is either absent or bypassed in what is denoted herein as a direct-charge system. In a direct-charge system, the power converter itself is directly charging the portable device's battery. But note that modern smartphones typically have the battery non-removably integrated into the phone so that if the battery is defective, the entire smartphone becomes defective. This is especially problematic given the high cost of modern smartphones. It is thus critical that a power converter such as flyback converter 100 regulate the constant-voltage and constant-current modes with considerable precision so that the health of the mobile device's battery is preserved. The tolerance for these operating modes is thus reduces in direct-charge systems (e.g., +/−1% of the desired constant current or constant voltage). Despite this reduced tolerance, note that there is a substantial tolerance on the component parameters controlling the proportionality between the peak current and the output current such as the sense resistance and the transformer reset time. It is thus problematic for primary-side-regulation of the output current to achieve the necessary tolerance during constant-current operation.

There is thus a need in the art for flyback converters having improved primary-side regulation of the output current during constant-current operation.

SUMMARY

A flyback converter for direct-charge applications is provided with a secondary-side output current calibration circuit. This calibration circuit senses the output current so that the regulation of the power switch cycling in constant-current modes of operation may be adjusted responsive to the sensed output current. But this sensing of the output current is done relatively infrequently as compared to the power switch cycling frequency so that stability of the control loop for the constant-current operation is not affected by the output current calibration.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
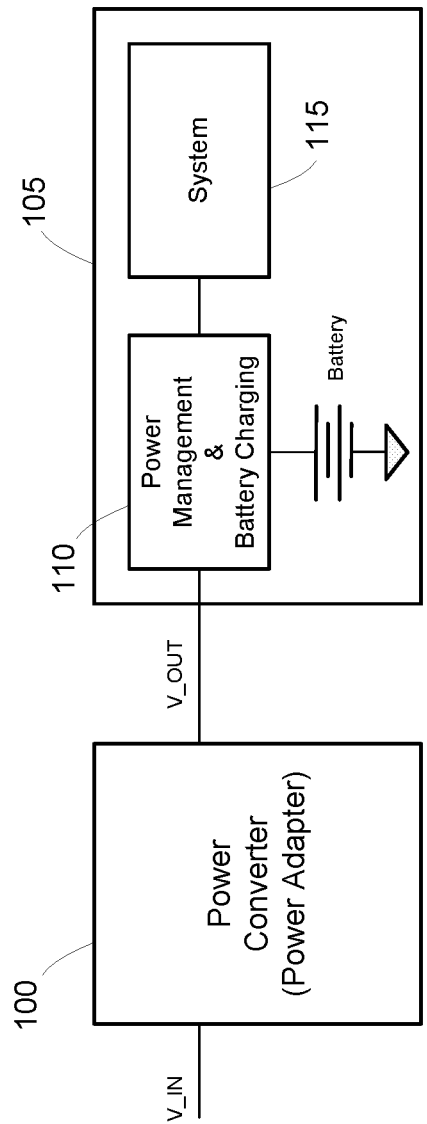
FIG. 1 is a diagram of a conventional mobile device charging system in which the mobile device includes a power management circuit.
Figure 2:
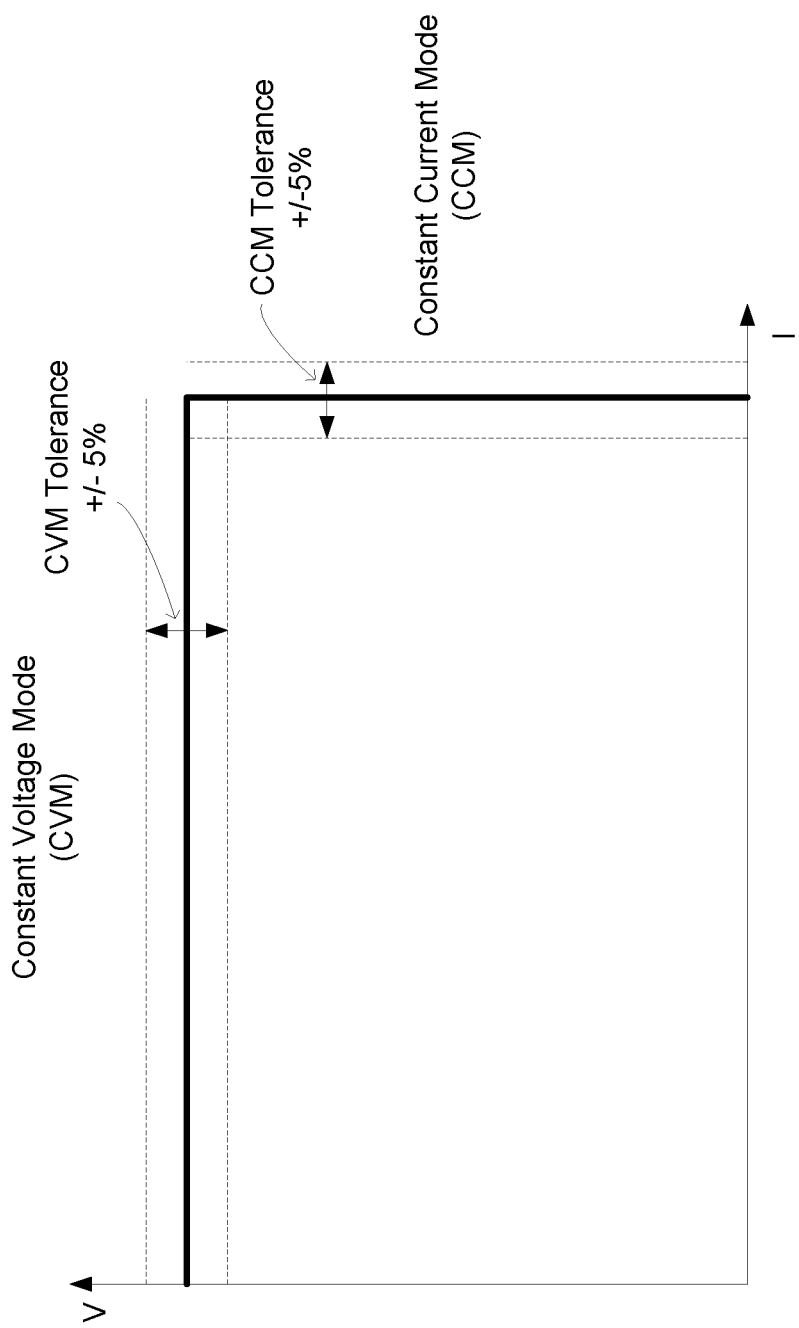
FIG. 2 is a plot showing the increased tolerance due to the mobile device's power management circuit for the constant-voltage and constant-current modes of operation in the power converter in system of FIG. 1.

To address the need in the art for improved primary-side regulation of the output current during constant-current operation, a secondary-side calibration technique is introduced. This calibration is relatively low frequency and thus does not disrupt or alter the loop stability for the primary-side regulation. To better appreciate the advantages of this calibration, the factors affecting the accuracy of primary-side regulation during a constant-current mode of operation for a flyback converter will first be discussed. The output current of a flyback converter operating in the discontinuous conduction mode is given by the following Equation (1):

$$I_o = \frac{I_{sec\_pk}}{2} \frac{T_{rst}}{T_p} \quad \text{Eq. (1)}$$

where $I_o$ is the output current, $I_{sec\_p}k$ is the secondary peak current, $T_p$ is the switching cycle period for the power switch, and $T_{rst}$ is the transformer reset time. The transformer reset time is defined by the delay between the cycling off for the power switch and the subsequent ramping of the secondary current from its peak ($I_{sec\_pk}$) to zero. The secondary peak current $I_{sec\_pk}$ equals the primary peak current $I_{pk}$ multiplied by the turns ratio $N_{ps}$ for the flyback's transformer. Since a sense resistor Rs is used to measure the primary peak current ($I_{pk}$) by a measurement of the peak voltage ($V_{ipk}$) across the sense resistor during each switching cycle, the relationship for the output current in Equation (1) may be rewritten as shown in the following Equation (2):

$$I_o = \frac{1}{2} N_{ps} \frac{V_{ipk}}{R_{sense}} \frac{T_{rst}}{T_p} \quad \text{Eq. (2)}$$

An examination of Equation (2) illustrates the difficulties in maintaining a precise regulation of the output current. For example, the measurement of Tp, Trst, Nps, and Rsense are all subject to manufacturing tolerances, parasitic effects, and resulting uncertainty. A conventional regulation of the output current during a constant-current mode of operation will thus fail to satisfy the stringent requirements for a direct-charge system. From Equation (2), it may be seen that during constant-current mode, is conventional to set the peak voltage $V_{ipk}$ using the following Equation (3):

$$V_{ipk} = k_{CC} \frac{T_p}{T_{rst}} \quad \text{Eq (3)}$$

where $k_{CC}$ is a proportionality constant that is conventionally static. By comparing Equations (2) and (3), it may be seen that by controlling the peak voltage $V_{ipk}$ according to Equation (3) keeps the output current constant as is appropriate for a constant-current mode of operation. The output current as a function of the proportionality constant $k_{CC}$ is given by the following Equation (4):

$$I_o = \frac{1}{2} N_{PS} \frac{k_{CC}}{R_{sense}} \eta_x \quad \text{Eq. (4)}$$

where ηx is the transformer conversion ratio. The switching period $T_p$ is typically constant (although it may be subject to dithering) so that the transformer reset time $T_{rst}$ controls the bulk of the adjustment on a cycle-to-cycle basis for the peak voltage. In a conventional primary-only regulation of the constant output current, the factors Tp and Trst in one switching cycle are applied to the subsequent switching cycle to determine the desired peak voltage. The voltage across the sense resistor is then compared to the desired peak voltage to determine the switch on-time by cycling off the power switch once the voltage across the sense resistor reaches the desired peak voltage. But this conventional primary-side regulation of the output current is problematic with regard to providing the desired degree of precision and tolerance such as required for direct-charge systems.

To provide increased regulation precision and tighter tolerances for the constant-current mode operation, a secondary-side calibration circuit is provided that directly measures the output current under known operating conditions. For example, the secondary-side calibration circuit may use a secondary-side sense resistor. Since the resistance is known for the secondary-side sense resistor, the secondary-side calibration circuit may measure the output current by detecting the voltage across the secondary-side sense resistor and dividing by the resistance of the secondary-side sense resistor as governed by Ohm's law. Note that there is a proportionality between the proportionality constant $k_{CC}$ of Equation (3) and the desired value for the output current as governed by Equation (4). The secondary-side calibration circuit thus commands the primary-side controller to adjust its proportionality constant $k_{CC}$ based upon the difference between the desired output current and the measured output current. In this fashion, the constant-current mode regulation precision is advantageously improved. Despite the use of a secondary-side calibration circuit, the primary-side regulation loop is unaffected since the frequency of calibration is relatively low. In contrast, the switching frequency for the power switch is often relatively high (e.g., 50 KHz or higher). Since the calibration is performed relatively infrequently, it has no real effect on the primary-side regulation of the output current. There are thus no stability issues raised by the inclusion of the secondary-side calibration circuit.

Figure 3A:
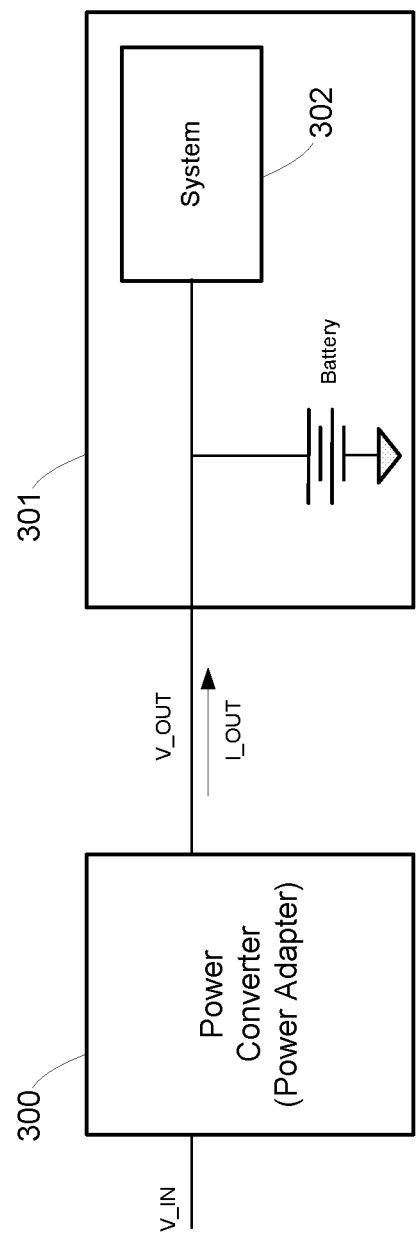
FIG. 3A a diagram of a direct-charge system in which a mobile device does not include a power management circuit and in which a flyback converter includes a secondary-side output current calibration circuit in accordance with an aspect of the disclosure.
Figure 3B:
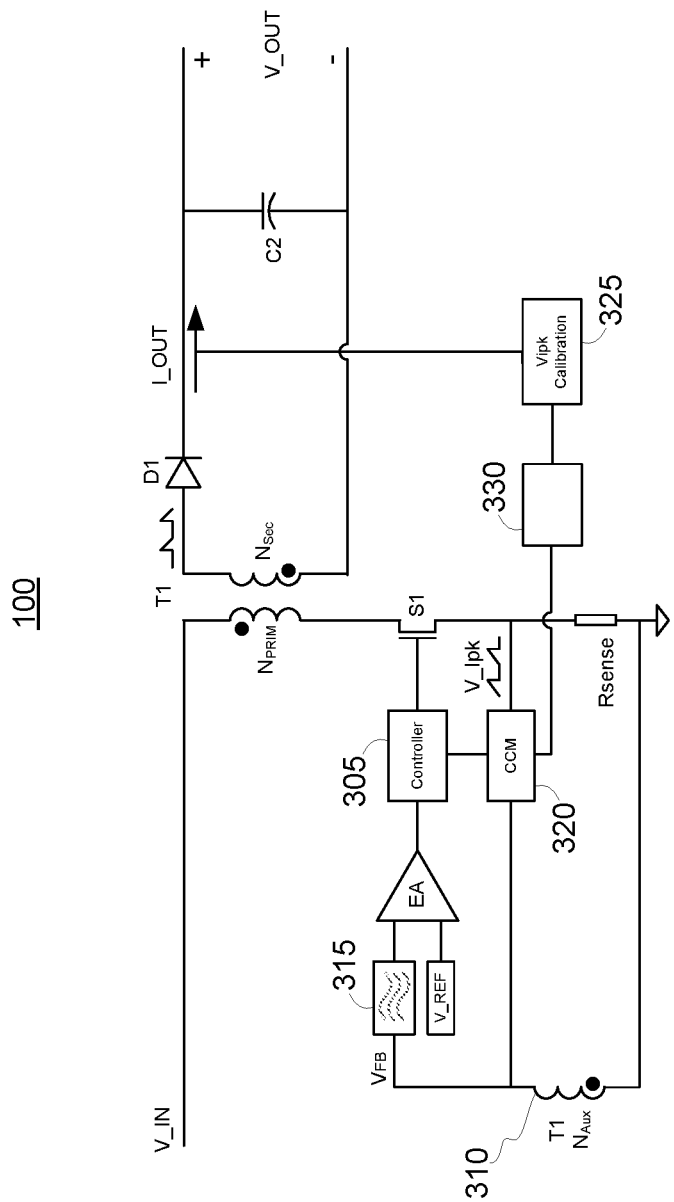
FIG. 3B is a block diagram for the flyback converter of FIG. 3A.

An example flyback converter 300 with secondary-side output current calibration is shown in FIG. 3A. The precision provided by the secondary-side output current calibration enables flyback converter 300 to safely power a directly charge a battery for powering a system 302 in a mobile device 301. In this direct-charge configuration, there is no power management circuit that controls the charging of the battery in mobile device 301. Instead, it is flyback converter 300 that must regulate the constant-voltage and constant-current charging modes for the battery. Flyback converter 300 is shown in more detail in FIG. 3B. A primary-side controller 305 controls the switching of a power switch transistor S1 to regulate operation in either a constant-voltage or a constant-current mode of operation. During constant-voltage regulation, controller 305 samples an output voltage Vout indirectly by sampling a feedback voltage (VFB) on an auxiliary winding 310 of a transformer T1. The feedback voltage is filtered in a loop filter 315 and compared to a reference voltage (V_REF) at an error amplifier (EA) to produce an error voltage. Depending upon the error voltage and the desired output voltage, controller 305 adjusts the modulation of the cycling of the power switch transistor such as through pulse-width modulation or pulse frequency modulation to keep the output voltage at the desired level during constant-voltage operation. But depending upon the charging state of a battery (not illustrated) being charged in a mobile device, controller 305 may not be able to adjust the output voltage to the desired level. Controller 305 then switches to a constant-current mode of operation as represented by a CC mode controller 320 that is shown separately from controller 305 for illustration purposes since it would typically be integrated with controller 305.

In the constant-current mode of operation, controller 320 monitors the peak voltage Vipk that develops across a sense resistor Rsense that is in series with the power switch transistor S1, which in turn is in series with a primary winding of transformer T1. During the on-time for each power switch cycle, a rectified input voltage V_IN causes a magnetizing current to flow through the power switch transistor S1 and thus through the sense resistor. Once the peak voltage Vipk reaches a desired level, controller 305 switches off the power switch transistor S1. A peak secondary current then flows through a secondary winding for transformer D1 to produce the output current I_OUT that flows to the load (not illustrated). The output current charges a smoothing capacitor C2 to develop the output voltage. An output diode D1 rectifies the secondary current although it will be appreciated that such rectification may be performed using a synchronous rectifier switch as known in the synchronous rectification arts.

Controller 320 can only indirectly control the output current such as through the use of Equation (3) above since controller 320 is isolated through transformer T1 from the secondary side of flyback converter 300. In a traditional use of Equation (3), the proportionality constant $k_{CC}$ is constant. But a Vipk calibration circuit 325 in flyback converter 300 directly measures the output current so that the proportionality constant $k_{CC}$ may be adjusted to keep the output current at the desired level. In this fashion, the inaccuracies resulting from parasitic effects and component tolerances such as for the sense resistor are reduced so that the output current may be regulated in constant-current mode according to the tight tolerances (e.g., +/−1%) demanded by direct-charge applications. The measurement of the output current by Vipk calibration circuit 325 occurs on the secondary-side of transformer T1. But this measurement cannot be directly communicated to the primary-side of transformer T1 such as through a wire or lead because the isolation between the grounds on the primary and secondary sides of transformer T1 would be destroyed. Thus, Vipk calibration circuit 325 communicates the necessary calibration information through an isolating channel such an optoisolator 330. In alternative embodiments, other types of isolating channels may be used such as a capacitor or a use of transformer T1 itself.

Figure 4:
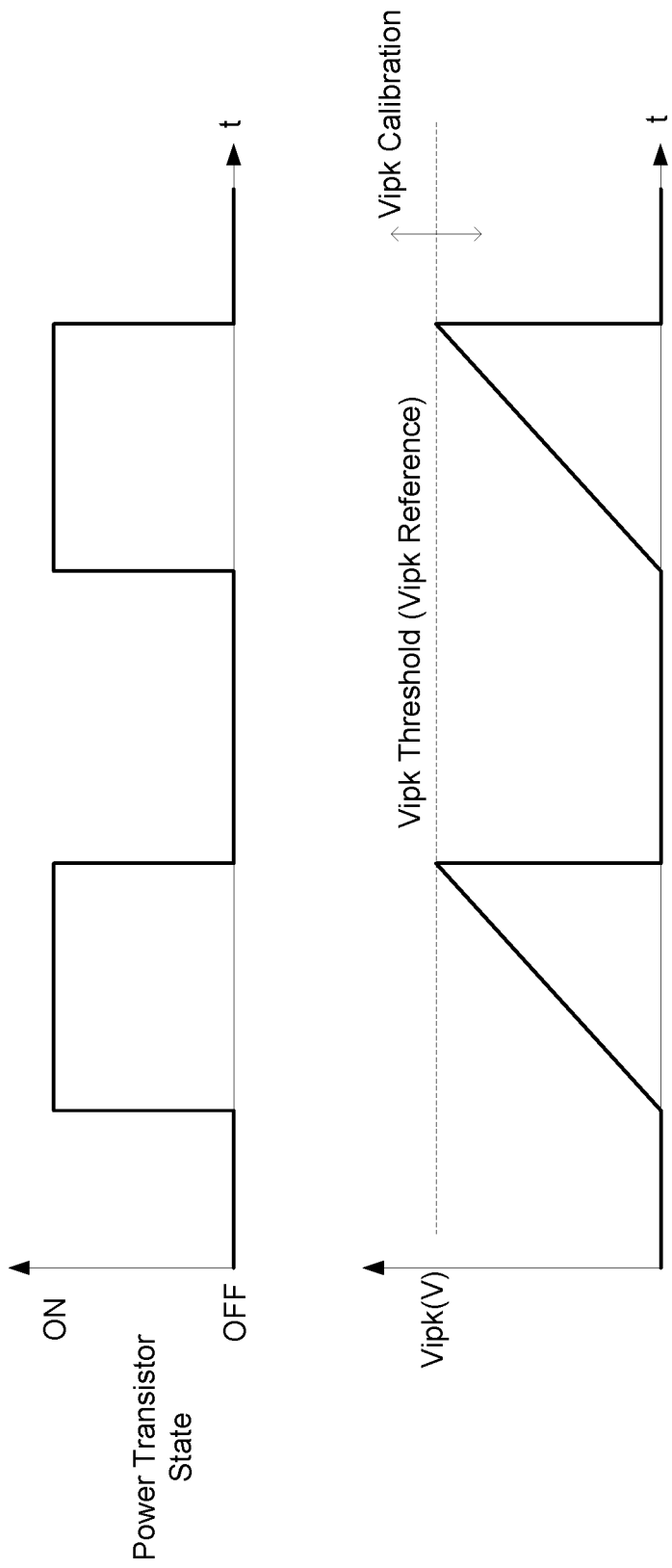
FIG. 4 is plot of the power switching waveform and the peak voltage adjustment waveform for the flyback converter of FIG. 3B.

Given the calibration information regarding the measured output current, controller 320 alters the proportionality constant $k_{CC}$ accordingly. In this fashion, the level for Vipk is altered from what a conventional application of Equation (3) would provide. Some example waveforms for the power switch cycling and the sense resistor voltage are shown in FIG. 4. For each on-time of the power switch transistor, the sense resistor voltage rises from ground to Vipk, whereupon the power switch transistor is cycled off. Referring again to Equation (3), the switching period Tp is substantially constant so it is the transformer reset time Trst that controls the conventional cycle-to-cycle adjustment of Vipk. But the calibration of the proportionality constant $k_{CC}$ raises or lowers Vipk accordingly so that the output current is more tightly regulated.

Figure 5:
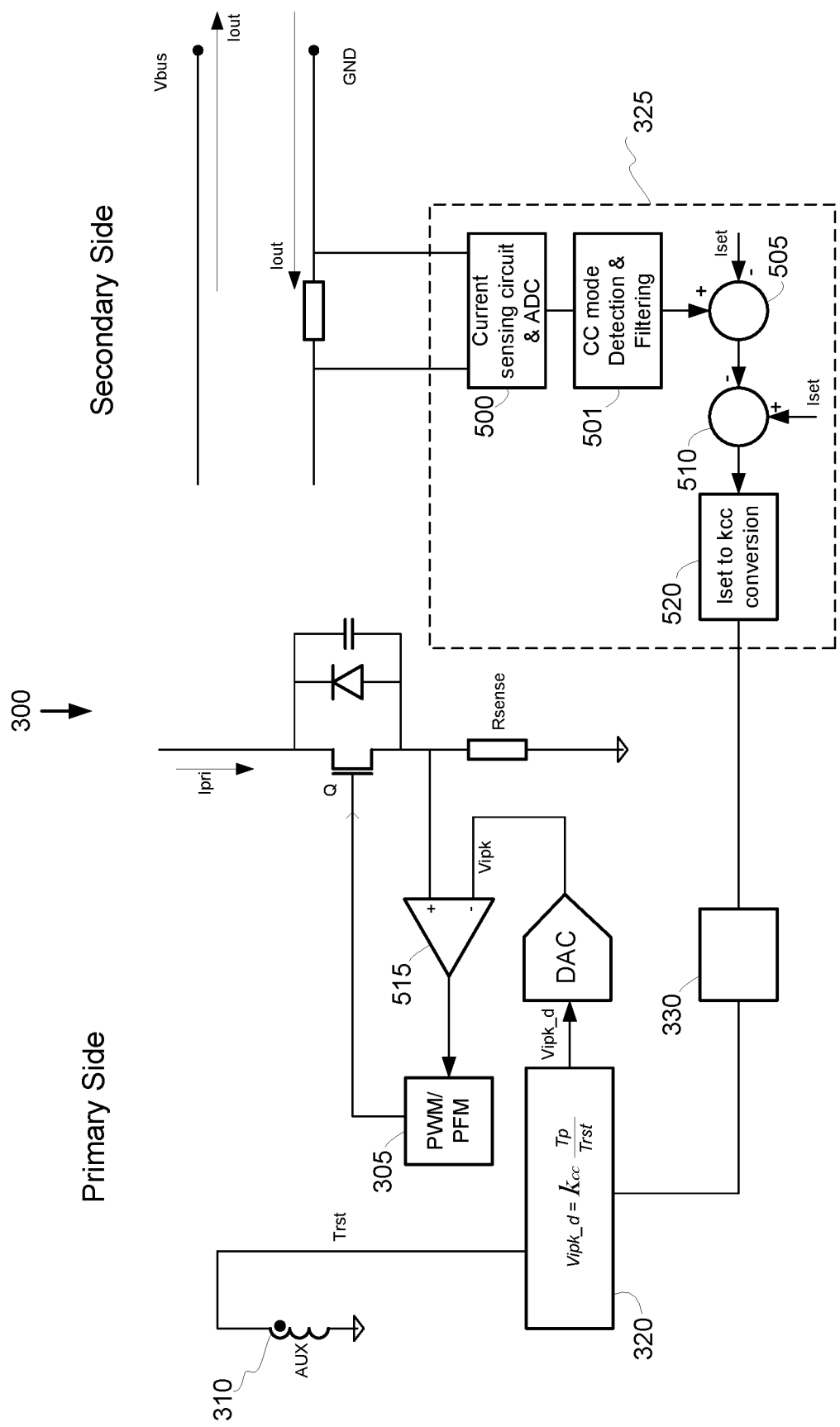
FIG. 5 is a more detailed illustration of the constant-current calibration for the flyback converter of FIG. 3B.

Additional details for the proportionality constant calibration in flyback converter 300 are shown in FIG. 5. To directly measure the output current, a secondary-side sense resistor is inserted into the ground path return for output voltage. The output current Iout is delivered to the load (not illustrated) during constant-current operation and returns along the ground path to develop a voltage across the secondary-side sense resistor that is proportional to the output current. A current sensing circuit and analog-to-digital converter (ADC) 500 in secondary-side output calibration circuit 325 senses the output current Iout by sensing the sense resistor voltage and proportionally converting it into a digital value representative of the output current. A constant-current mode detection and filtering circuit 501 detects whether the load is being driven in a constant-current mode by, for example, comparing the output current to an output current limit. Should regulation of the output voltage drive the output current to reach an output current limit, flyback converter 300 can no longer operate in a constant-voltage mode but must instead operate in a constant-current mode so that that the output current does not exceed the output current limit. In addition, constant-current mode detection and filtering circuit filters the output current calibration so that the output current calibration is done relatively infrequently as compared to the power switch cycling frequency. In this fashion, the gain and phase margin for the constant-current mode of operation is not affected by the output current calibration.

During the constant-current mode of operation, controllers 320 and 305 (are regulating the cycling of the power switch transistor to keep the output current at a desired level, which is designated herein as Iset. Calibration circuit 325 includes an adder 505 that forms the difference between the measured output current and Iset. This difference is then subtracted from Iset in another adder 510 to form a calibrated desired output current (designated herein as iset). This adjusted desired output current maps to an adjusted proportionality constant $k_{CC}$ as defined by an iset-to-$k_{CC}$ conversion circuit 520 that is then communicated through an isolating communication channel such as optoisolator 330 to the primary side of flyback converter 300. Should the output current calibration indicate that the measured output current is greater than the desired level, the iset-to-$k_{CC}$ conversion lowers $k_{CC}$ from its default value that would otherwise be used for the achieving constant-current operation at the desired level. Conversely, should the output current calibration indicate that the measured output current is less than the desired level, the iset-to-$k_{CC}$ conversion increases $k_{CC}$ from its default value that would otherwise be used for the achieving constant-current operation at the desired level. It will be appreciated that adders 505 and 510, conversion circuit 520, and the constant-current detection and filtering circuit 501 may be performed either on the secondary side or the primary side of the transformer.

Constant-current mode controller 320 uses the transformer reset time Trst as determined by sensing the reflected voltage on auxiliary winding 310 and forms a digital version (Vipk_d) of the desired peak voltage using Equation (3) with the adjusted proportionality constant $k_{CC}$. A digital-to-analog converter (DAC) converts the digital peak voltage into the analog peak voltage Vipk so that it compared to the primary-side sense resistor voltage in a comparator 515. When the sense resistor voltage reaches the peak voltage Vipk, the comparator output signal transitions to a binary one level (e.g, a power supply voltage) to trigger controller 305 to shut off the power switch transistor so as to terminate its on-time in the current power switch cycle. Controller 305 may regulate this power switch cycling in either a pulse-width modulation (PWM) or a pulse frequency modulation (PFM) mode of operation. But note that the resulting regulation of the output current is now much more tightly controlled due to the adjustment with regard to the sensing of the output current.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A circuit for a flyback converter, comprising:
a peak voltage determination circuit configured to determine a desired peak voltage for a current switching cycle of a power switch transistor responsive to a transformer reset time and an adjusted proportionality constant, wherein the adjusted proportionality constant is adjusted responsive to a determination of an output current for the flyback converter;
a comparator configured to compare the desired peak voltage to a primary-side sense resistor voltage; and
a power switch controller configured to shut off a power switch transistor responsive to an output signal from the comparator indicating that the primary-side sense resistor voltage equals the desired peak voltage.

2. The circuit of claim 1, wherein the peak voltage determination circuit is further configured to determine the desired peak voltage responsive to a switching period for a cycling of the power switch transistor.

3. The circuit of claim 1, wherein the peak voltage determination circuit and the power switch controller are both implemented within a microcontroller.

4. The circuit of claim 1, further comprising:
a current sense circuit configured to sense a secondary-side sense resistor voltage; and
an analog-to-digital converter configured to convert the secondary-side sense resistor voltage into a digital signal.

5. The circuit of claim 4, further comprising:
a first adder configured to determine a difference between the digital signal and a desired level for the output current.

6. The circuit of claim 5, further comprising:
a second adder configured to determine a difference between the desired level for the output current and the difference from the first adder to provide an adjusted output current level.

7. The circuit of claim 6, further comprising:
a conversion circuit configured to convert the adjusted output current level into the adjusted proportionality constant.

8. The circuit of claim 1, further comprising an isolated communication channel, wherein the peak voltage determination circuit is further configured to receive the adjusted proportionality constant from the isolated communication channel.

9. The circuit of claim 8, wherein the isolated communication channel comprises an optoisolator.

10. The circuit of claim 8, wherein the isolated communication channel comprises a transformer for the flyback converter.

11. The circuit of claim 1, wherein the peak voltage determination circuit is further configured to determine the desired peak voltage during a constant-current mode of operation for the flyback converter.

12. A method for calibrating a flyback converter during a constant-current mode of operation, comprising:
sensing an output current for the flyback converter to provide a sensed output current;
adjusting a proportionality constant responsive to a difference between a desired output current and the sensed output current to provide an adjusted proportionality constant; and
determining a peak voltage for a primary-side sense resistor during a current cycle of a power switch transistor responsive to the adjusted proportionality constant.

13. The method of claim 12, further comprising:
shutting off the power switch transistor during its current cycle responsive to a voltage for the primary-side sense resistor equaling the peak voltage.

14. The method of claim 12, wherein the determining of the peak voltage is further responsive to a transformer reset time.

15. The method of claim 12, wherein the determining of the peak voltage is further responsive to a period for the cycling of the power switch transistor.

16. The method of claim 12, wherein the sensing of the output current comprises sensing a voltage for a secondary-side sense resistor to provide a sensed voltage.

17. The method of claim 16, further comprising digitizing the sensed voltage to provide a digitized sensed voltage.

18. The method of claim 17, further comprising determining a difference between the desired output current and the digitized sensed voltage to provide a first difference.

19. The method of claim 18, further comprising determining a difference between the desired output current and the first difference to provide a second difference, and wherein the adjusting of the proportionality constant responsive to the difference between the desired output current and the sensed output current comprises adjusting the proportionality constant responsive to the second difference.

* * * * *